(12) United States Patent
Berntsson et al.

(10) Patent No.: US 10,787,145 B2
(45) Date of Patent: Sep. 29, 2020

(54) AIRBAG DEVICE FOR A MOTOR VEHICLE, AND AIRBAG CUSHION FOR AN AIRBAG DEVICE

(71) Applicants: Mats Berntsson, Våargårda (SE); Pär Sandinge, Alingsås (SE); Hanna Karlsson, Stora Levene (SE)

(72) Inventors: Mats Berntsson, Våargårda (SE); Pär Sandinge, Alingsås (SE); Hanna Karlsson, Stora Levene (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/062,675

(22) PCT Filed: Dec. 16, 2016

(86) PCT No.: PCT/EP2016/081403
§ 371 (c)(1),
(2) Date: Jun. 15, 2018

(87) PCT Pub. No.: WO2017/103090
PCT Pub. Date: Jun. 22, 2017

(65) Prior Publication Data
US 2018/0290620 A1    Oct. 11, 2018

(30) Foreign Application Priority Data

Dec. 17, 2015 (DE) .................. 10 2015 016 347

(51) Int. Cl.
*B60R 21/231* (2011.01)
*B60R 21/207* (2006.01)
*B60R 21/00* (2006.01)

(52) U.S. Cl.
CPC ...... *B60R 21/23138* (2013.01); *B60R 21/207* (2013.01); *B60R 2021/0006* (2013.01);
(Continued)

(58) Field of Classification Search
CPC ........ B60R 2021/23146; B60R 21/207; B60R 21/23138
See application file for complete search history.

(56) References Cited

U.S. PATENT DOCUMENTS

| 975,519 | A | 11/1910 | Fulton |
| 5,895,070 | A | 4/1999 | Lachat |

(Continued)

FOREIGN PATENT DOCUMENTS

| DE | 19635495 A1 * | 3/1998 | ....... B60R 21/23138 |
| DE | 102005051171 A1 | 4/2007 | |

(Continued)

OTHER PUBLICATIONS

International Search Report for PCT/EP2016/081403, ISA/EP, Rijswijk, NL, dated Feb. 27, 2017, with English translation.

(Continued)

*Primary Examiner* — Nicole T Verley
(74) *Attorney, Agent, or Firm* — Stephen T. Olson; Harness, Dickey & Pierce, P.L.C.

(57) ABSTRACT

An airbag device for a motor vehicle, the airbag device can be provided on and secured to a seat frame and is designed to protect the head and rib cage of an occupant in the event of side impact or vehicle rollover. The airbag device has a gas generator, an airbag cushion and a first securing system, the first securing system, the gas generator and the airbag cushion being connected to one another to secure the airbag device to the seat frame. A second securing system is provided in the side region of the airbag cushion above the connecting region with the first securing system The second securing system is designed to secure the airbag cushion, with an additional securing point in the side region, to the seat frame above the first securing system.

10 Claims, 8 Drawing Sheets

(52) U.S. Cl.
CPC ............... *B60R 2021/0018* (2013.01); *B60R 2021/0044* (2013.01); *B60R 2021/0048* (2013.01); *B60R 2021/23146* (2013.01)

(56) References Cited

U.S. PATENT DOCUMENTS

| | | | | |
|---|---|---|---|---|
| 7,240,915 | B2* | 7/2007 | Peng | B60R 21/23138 |
| | | | | 280/730.2 |
| 7,845,674 | B2 | 12/2010 | Berntsson et al. | |
| 7,971,900 | B2* | 7/2011 | Lim | B60R 21/207 |
| | | | | 280/730.2 |
| 8,047,564 | B2* | 11/2011 | Kibat | B60R 21/23138 |
| | | | | 280/730.2 |
| 8,882,141 | B2* | 11/2014 | Arnold | B60R 21/18 |
| | | | | 280/733 |
| 9,365,180 | B2* | 6/2016 | Acker | B60R 21/207 |
| 9,682,681 | B1* | 6/2017 | Patel | B60R 21/239 |
| 10,099,645 | B2* | 10/2018 | Song | B60R 21/207 |
| 10,246,041 | B2* | 4/2019 | Kobayashi | B60R 21/207 |
| 10,336,284 | B2* | 7/2019 | Dry | B60R 21/2338 |
| 2011/0025027 | A1 | 2/2011 | Lim et al. | |
| 2012/0049498 | A1 | 3/2012 | Wiik et al. | |
| 2015/0084315 | A1* | 3/2015 | Acker | B60R 21/23138 |
| | | | | 280/728.2 |
| 2015/0197212 | A1 | 7/2015 | Fujiwara | |
| 2019/0161053 | A1* | 5/2019 | Gwon | B60N 2/64 |

FOREIGN PATENT DOCUMENTS

| | | | | |
|---|---|---|---|---|
| DE | 102009006688 | A1 | | 8/2010 |
| DE | 102009044734 | A1 | | 2/2011 |
| DE | 102014214396 | A1 * | 1/2016 | ............. B60R 21/18 |
| DE | 102015001198 | A1 * | 8/2016 | ........... B60R 21/231 |
| EP | 0855975 | A1 | | 8/1998 |
| EP | 2876002 | A1 | | 5/2015 |
| EP | 3012158 | A1 * | 4/2016 | ........... B60R 21/207 |
| GB | 2322338 | A * | 8/1998 | ....... B60R 21/23138 |

OTHER PUBLICATIONS

Written Opinion of the ISA for PCT/EP2016/081403, ISA/EP, Rijswijk, NL, dated Feb. 27, 2017.

* cited by examiner

AIRBAG DEVICE FOR A MOTOR VEHICLE, AND AIRBAG CUSHION FOR AN AIRBAG DEVICE

CROSS-REFERENCE TO RELATED APPLICATIONS

This application is a 371 U.S. National Stage of International Application No. PCT/EP2016/081403, filed Dec. 16, 2016. This application claims priority to German Patent Application No. 10 2015 016 347.7, filed Dec. 17, 2015. The entire disclosures of the above applications are incorporated herein by reference.

FIELD

The present invention relates to an airbag device for a motor vehicle which can be arranged and fixed to a seat frame, and which is designed to protect the head and thorax of an occupant in the event of a side impact or vehicle rollover. Furthermore, the present invention relates to an airbag cushion for the mentioned airbag device.

BACKGROUND

Automotive airbag devices are nowadays being widely used in modern automobiles as additional protection systems. For example, airbag devices are used as a protection system for the driver of a motor vehicle, and are preferably arranged in the steering wheel directly in front of the driver of the motor vehicle for this purpose. Furthermore, airbag devices are also used as a protection system for the passenger, and are in this case preferably arranged in the dashboard in front of the passenger seat in the area of the glove compartment. It is also known to attach airbag devices in the lower part of the dashboard in front of the driver's seat and the passenger seat, which protect the knees and the lower legs of the driver and passenger in the event of an accident.

As further supplemental protection systems, airbag devices are also used for side protection of occupants of a motor vehicle to protect the head and thorax of an occupant in the event of a side impact or vehicle rollover. For this purpose, airbag devices are mounted, for example, in the outwardly facing side region of the backrest of the driver's seat or passenger seat, or they are located in the roof area of the interior above the side windows to protect the occupants of the vehicle in the event of an accident with a curtain inflated airbag cushion.

These known airbag devices are available in various sizes and embodiments, which are adapted to the respective planned mounting location or use in the interior of the vehicle.

For example, from DE 10 2009 044 734 an airbag device for side protection of occupants of a motor vehicle is known, which is attached to a predetermined portion of the seat frame. This known airbag device comprises an airbag module as well as a folded airbag cushion being arranged in this airbag module. The airbag module is mounted to the seat frame by means of bolts and further includes a bracket that is coupled to a predetermined portion of the airbag cushion with a first end and to the bolt with a second end. By means of the bracket the airbag cushion should deploy with a predetermined length to a predetermined position when the airbag cushion is inflated.

In recent years, however, the requirements for the safety systems in motor vehicles have increased significantly, not least because of the stricter safety regulations of the authorities responsible for motor vehicle safety. In order to achieve the highest rating for a motor vehicle by the authorities responsible for motor vehicle safety, it is now necessary to equip motor vehicles with a so-called "FCA" (Front Center Airbag). This FCA is located in the center of the vehicle between the driver's seat and a passenger seat, preferably in a lateral area of the backrest of the driver's seat or the passenger seat facing the adjacent seat, and protects a person's flank or head in those seats in the event of a side impact when the airbag cushion is deployed.

Due to the given geometry of the seats, and the resulting limitation of the installation space, there is no sufficient installation space for an airbag module of an FCA in the upper side region of the seat and in the headrest. Airbag modules for FCA can therefore be housed without interference only in the lower side region of the backrest, since only here sufficient installation space is available.

However, the arrangement of the airbag module in the lower side region of the backrest has a number of disadvantages.

Conventional airbag modules are usually constructed symmetrically, which means that the gas generator is arranged in the middle and the airbag cushion is folded symmetrically towards the center. When the airbag module is triggered, the airbag cushion is thus also inflated symmetrically, that is to say the airbag cushion unfolds in equal parts above and below the gas generator, which entails a stable positioning behavior of the airbag cushion. If a conventional airbag module is used with a conventional airbag cushion for a FCA, an extra-large airbag cushion must be used that must in the deployed and respectively inflated state extend upwards from the installation position of the airbag module in the lower side of the backrest up to a position above the headrest of the seat in order to protect a person's head.

On the one hand, this extra-large airbag cushion requires a large volume even when folded. However, the volume for installing modules in the lower side region of the backrest is limited, so that when installing an extra-large airbag cushion functional problems arise due to the increased volume of the extra-large airbag cushion.

On the other hand, an equally large part of the extra-large airbag cushion is deployed and inflated downwards, since the airbag cushion is in this case symmetrically folded toward the gas generator. At the bottom, however, the space between the two seats is limited by the transmission tunnel or the center console, so that the lower part of the extra-large airbag cushion cannot unfold properly. As a result, however, the deployment of the upper part of the extra-large airbag cushion, as well as its positioning relative to the head, is influenced, so that the safe operation cannot be guaranteed.

To avoid the latter disadvantage, it is known to fold the airbag cushion and to attach it to the inflator in a way that it unfolds substantially asymmetrically from the inflator upwards when the inflator is triggered and inflates the airbag cushion.

Thus, a smaller airbag cushion may be used which requires a smaller volume in the folded state, and the airbag device may be mounted in the lower side region of the backrest of the seat, where there is sufficient volume for accommodating the airbag device. Furthermore, an influence of the inflated airbag cushion by the center console and the transmission tunnel is avoided.

On the other hand, however, such an airbag cushion has an unstable positioning behavior, since the distance from the attachment point of the airbag cushion on the seat frame to the head portion of the airbag cushion is large and the airbag cushion is inflated asymmetrically, so that a rotation or displacement of the head portion of the airbag cushion with respect to the intended application position is possible. In particular, since the airbag cushion is deployed upwardly and forwardly in the longitudinal direction of the vehicle (i.e., unbalanced with respect to the gas generator), it is possible for the airbag cushion to undergo a backward twist that guides the head portion of the airbag cushion out of the intended application position. So, there is a risk that the passengers in the front seats collide with the heads in the event of a side impact or vehicle rollover.

This backward twisting of the airbag cushion is mainly due to the explosion-like rapid inflation of the airbag cushion, and the subsequent deflation after complete inflation.

SUMMARY

In view of this background, it is therefore an object of the present invention to provide a simple, cost-effective and functionally reliable airbag device for a motor vehicle, which reliably protects the head and thorax of an occupant in the event of a side impact or vehicle rollover. It is another object of the present invention to provide an airbag cushion for a motor vehicle, which reliably protects the head and thorax of an occupant in the event of a side impact or vehicle rollover.

The airbag device for a motor vehicle according to the invention can be arranged and fixed to a seat frame and is designed to protect the head and thorax of an occupant in the event of a side impact or vehicle rollover. It comprises a gas generator, an airbag cushion and a first attachment arrangement. The first attachment arrangement interconnects the inflator and the airbag cushion to secure the airbag device to the seat frame. According to the invention and advantageously, the airbag device has a second attachment arrangement which is arranged at the side region of the airbag cushion above the connection region with the first attachment arrangement and which is designed to fasten the airbag cushion with an additional attachment point to the seat frame above the first attachment arrangement.

By this inventive and advantageous embodiment an additional attachment point for the airbag cushion is provided above the first attachment arrangement, which significantly increases the stability and positioning accuracy of the airbag cushion. In particular, this achieves the result that the head region of the airbag cushion is reliably positioned in the intended deployment area next to the headrest of the seat when the airbag cushion is activated, thus ensuring the functionality of the airbag device according to the invention. A collision of the heads of passengers sitting in the front seats can thus reliably be avoided, so that the occupants are reliably protected even in the event of a side impact or vehicle rollover.

It is to be regarded as particularly advantageous in this context that during the inflation of the airbag cushion a backward rotation of the airbag cushion is prevented by providing an additional fastening point above the first attachment arrangement. This ensures the accurate and reliable positioning of the head region of the airbag cushion in the intended deployment area next to the headrest of the seat. In order to achieve a timely intervention of the second attachment arrangement, and thus to avoid any attempt of a reverse rotation of the airbag cushion, the airbag cushion is advantageously and according to the invention attached to the seat frame directly with the second attachment arrangement. Thus, the lower end of the airbag remains in the vicinity of the gas generator even when the airbag is inflated.

A first preferred embodiment therefore provides that the second attachment arrangement comprises a mounting recess, by means of which the airbag cushion can be fastened directly to the seat frame with a side region of the airbag cushion. Thus, what is provided according to the invention and advantageous, the airbag cushion can be attached directly to the seat frame with a side region by means of bolts, screws or the like cooperating with the seat frame and the mounting recess.

According to a further preferred embodiment, the mounting recess is provided with a surrounding reinforcing material. This may according to the invention and advantageously be sewn or glued to the airbag cushion around the mounting recess, so that a strong and firm connection between the airbag cushion and the seat frame is made, which can withstand the strong forces arising during inflation of the airbag cushion and thus guarantees the operability of the airbag device.

According to a further advantageous embodiment, the mounting recesses is formed as a mounting hole that is tuned with the diameter of the intended fastener in such a way that the airbag cushion can be quickly and easily attached and fixed with the additional attachment point on the seat frame. This allows a quick and easy mounting of the airbag cushion on the seat frame, which facilitates the overall assembly of the airbag device.

A second preferred embodiment provides that the second attachment arrangement has a tension element that is arranged with a first end in the side region of the airbag cushion above the connection region with the first attachment arrangement. According to the invention and advantageously, a fastening device is provided on the tension element in order to fasten the airbag cushion to an additional fastening point on the seat frame above the first attachment arrangement by means of the fastening device.

According to an advantageous embodiment of the invention, the tension element is designed as a belt, so that the tension element can simply be folded or rolled together with the airbag cushion. The volume of the airbag device is thus further reduced overall, so that the required installation space for the airbag device in the side region of the seat is also reduced. Consequently, the upholstery and thus the comfort of the seat can be improved.

A third preferred embodiment provides that the second attachment arrangement has a tension element which is arranged with a first end in the side region of the airbag cushion above the connection region with the first attachment arrangement, and with a second end on the opposite side region of the airbag cushion. According to the invention and advantageously, a fastening device is provided on the tension element between the first end and the second end in order to fasten the airbag cushion to an additional attachment point on the seat frame above the first attachment arrangement by means of the fastening device.

According to the invention and advantageously, the fastening device is according to a further improvement arranged on the tension element such that the distance between the fastening device and the first end is less than the distance between the fastening device and the second end.

This allows for timely engagement of the second attachment arrangement when the airbag device is deployed, thus avoiding any approach of a twisting of the airbag cushion in a backwards direction.

In addition, according to the invention and advantageously it is provided that the tension element is designed as a belt, so that the tension element can be easily folded or rolled together with the airbag cushion. As a consequence, the overall volume of the airbag device is further reduced, so that the required installation space for the airbag device in the side region of the seat is also reduced. Consequently, the upholstery and thus the comfort of the seat can be improved.

According to a further preferred improvement of both the second embodiment and the third embodiment, the length of the tension element or of the belt is less than the width of the airbag cushion.

This allows early engagement of the second attachment arrangement when the airbag device is deployed, thus avoiding any approach of a twisting back of the airbag cushion and ensuring the operational capability of the airbag device.

Furthermore, this also stabilizes the airbag cushion in the lateral direction, so that lateral flapping away of the inflated airbag cushion is prevented. Thus, the inflated airbag cushion retains its position in the intended application area laterally adjacent to the seat, so that the reliability and operability is further improved.

Advantageously and according to the invention, according to a further improvement, the fastening device has a bracket which can be screwed, clamped or hooked onto the seat frame.

This substantially facilitates and simplifies the mounting of the airbag device to the seat frame. The bracket mounted at the tension element or the belt can easily be mounted to seat frames in the intended manner in order to form the additional attachment point above the first attachment arrangement. The airbag device is delivered for assembly as a package with the collapsed airbag cushion, wherein the tension member or the belt hangs as an appendage from the package. The airbag device is secured to the seat frame with the first attachment arrangement at the predetermined place, and the bracket attached to the strap is secured to the seat frame above the first attachment arrangement. With this inventive and advantageous embodiment of the second attachment arrangement as a belt which hangs as an appendage from the package, the airbag device can be packaged smaller compared to the first embodiment, so that it requires less installation space in the side region of the seat back. Consequently, among other things, the upholstery of the seat and thus the seating comfort can be improved.

According to a further preferred embodiment, the airbag device is arranged on the side of the seat frame, which is directed to the adjacent seat. This provides a simple and reliable airbag device with an FCA located in the center of the vehicle and effectively protects the occupants of the seats in the area of action of the FCA in the event of a side collision or vehicle rollover.

According to a further preferred embodiment, the largest part of the airbag cushion is arranged above the airbag device after the triggering of the airbag. This advantageously provides an airbag device for a motor vehicle which reliably protects both the head and the thorax of an occupant in the event of a side impact or a vehicle rollover.

According to a preferred development, the first attachment arrangement has fastening bolts, by means of which the airbag device can be arranged and fastened to the seat frame. According to the invention and advantageously this easily allows to insert the airbag device in a fail-safe manner into recesses provided on the seat frame for this purpose and fasten it there, which contributes to a fast and therefore cost-effective installation.

According to a further preferred development the fastening bolts can be arranged directly on the gas generator, which further simplifies the construction and thus the production of the airbag device and makes it more cost effective.

However, the fastening bolts can also be arranged on a fastening sleeve. In this case the gas generator is arranged within the fastening sleeve to form the airbag device. The person skilled in the art is aware of further possibilities for fastening the airbag device to the seat frame by means of fastening bolts, which are hereby included in the disclosure and the scope of the invention.

Further options for mounting the airbag device on the seat frame known to those skilled in the art are gluing or tension belts.

A further advantageous embodiment of the invention provides that the gas generator is arranged inside the airbag cushion. In this case the airbag cushion has second mounting recesses, which are designed to be attached to a fastening bolt.

This facilitates and simplifies the assembly of the airbag device substantially, especially if according to a further advantageous embodiment, the fastening bolts are arranged directly on the gas generator. In this case the airbag cushion advantageously has an integrated pocket into which the gas generator is introduced, and from which the airbag cushion is inflated when the gas generator is triggered. This integrated pocket comprises the second mounting recesses which, according to the invention and advantageously, are each designed as a mounting hole whose diameter is matched to the diameter of the fastening bolt so that it can preferably be pushed sealingly onto a fastening bolt.

According to a preferred improvement, the second attachment arrangement has bolts or screws by means of which the second attachment arrangement can be arranged and fastened to the seat frame above the first attachment arrangement. According to the invention and advantageously this makes it easily possible to secure the airbag device in a fail-safe manner with an additional attachment point on the seat frame, which contributes to a fast and therefore cost-effective installation.

It is to be considered particularly advantageous that the airbag device has only few components that can be easily connected to each other, and that the airbag device can be quickly and easily attached to a seat frame and connected to it firmly. This simplifies and facilitates the assembly and installation of the airbag device, and also reduces costs.

The airbag cushion for an airbag device for a motor vehicle according to the present invention may be arranged and fixed to a seat frame, and is configured to protect the head and thorax of an occupant in the event of a side impact or vehicle rollover. The airbag device includes, in addition to the airbag cushion, a gas generator and a first attachment arrangement, wherein the first attachment arrangement, the inflator and the airbag cushion are interconnected to secure the airbag device to the seat frame. According to the invention and advantageously, the airbag cushion has a second attachment arrangement which is arranged in the side region of the airbag cushion above the connection region with the first attachment arrangement and which is designed to fasten the airbag cushion with an additional fastening point at the seat frame above the first attachment arrangement.

By this inventive and advantageous embodiment, an additional attachment point for the airbag cushion is provided above the first attachment arrangement, which significantly increases the stability and positioning accuracy of the airbag cushion. In particular, it is achieved that the head region of the airbag cushion is reliably positioned in the intended deployment area next to the headrest of the seat, and thus ensures the functionality of the airbag device according to the invention. A collision of the heads of passengers sitting in the front seats can thus be reliably avoided, so that the occupants are reliably protected even in the event of a side impact or vehicle rollover.

To be considered particularly advantageous is that by means of the formation of an additional attachment point above the connecting portion of the first attachment arrangement with the airbag cushion, a reverse rotation of the airbag cushion during the deployment of the airbag cushion is prevented. This ensures the accurate and reliable positioning of the head region of the airbag cushion in the intended deployment area next to the headrest of the seat.

In this context the term "above" refers to the installation position of the airbag cushion in the airbag device. In the installation position, the airbag cushion has a side pointing downwards to the vehicle floor and a side pointing upwards to the vehicle roof. For the person skilled in the art the term "above" thus clearly defines the arrangement and relation of the second attachment arrangement to the first attachment arrangement. Likewise, attributions such as "bottom margin", "top margin", "side region", etc., are sufficiently defined for those skilled in the art.

In order to achieve a timely intervention of the second attachment arrangement, and thus to avoid any approach of a reverse rotation of the airbag cushion, the airbag cushion is advantageously and according to the invention directly attached to the seat frame with the second attachment arrangement. Thus, the lower end of the airbag remains in the vicinity of the gas generator even during deployment of the airbag.

A first preferred embodiment therefore provides that the second attachment arrangement has a mounting recess by means of which the airbag cushion can be fastened with a side region to the seat frame. Thus, what is provided according to a further preferred embodiment according to the invention and advantageous, the airbag cushion can directly be attached with its side region directly to the seat frame by means of bolts, screws or the like, which cooperate with the seat frame and the mounting recess.

According to a further preferred improvement, the mounting recess is provided with a surrounding reinforcing material. This may be according to the invention and advantageously sewn or glued to the airbag cushion around the mounting recess, so that a strong and firm connection between the airbag cushion and the seat frame is made which can withstand the strong forces arising during inflation of the airbag cushion and thus guarantees the operability of the airbag device.

According to a further advantageous embodiment, the mounting recesses is formed as a mounting hole that is tuned with the diameter of the intended fastener such that the airbag cushion can be quickly and easily attached and fixed with the additional attachment point on the seat frame. This allows a quick and easy mounting of the airbag cushion on the seat frame, which facilitates the overall assembly of the airbag device.

A second preferred embodiment provides that the second attachment arrangement has a tension element that is arranged with a first end at the side region of the airbag cushion above the connection region with the first attachment arrangement. According to the invention and advantageously, a fastening device is provided on the tension element in order to fix the airbag cushion with an additional attachment point on the seat frame above the first attachment arrangement by means of the fastening device.

According to an advantageous embodiment of the invention, the tension member is designed as a belt, so that the tension element can be easily folded or rolled together with the airbag cushion. So, the overall volume of the airbag device is further reduced, so that the required installation space for the airbag device in the side region of the seat is also reduced. Consequently, the upholstery and thus the comfort of the seat can be improved.

A third preferred embodiment provides that the second attachment arrangement has a tension element which is arranged with a first end in the side region of the airbag cushion above the connection region with the first attachment arrangement, and with a second end on the opposite side region of the airbag cushion.

According to the invention and advantageously, a fastening device is provided on the tension element between the first end and the second end in order to fix the airbag cushion with an additional attachment point on the seat frame above the first attachment arrangement by means of the fastening device.

In this case the fastening device according to the invention and advantageously according to an improvement is arranged on the tension element such that the distance between the fastening device and the first end is less than the distance between the fastening device and the second end.

This allows for timely engagement of the second attachment arrangement when the airbag device is deployed and the airbag cushion is inflated, thus avoiding any backward twisting of the airbag cushion.

In addition, according to the invention and advantageously it is provided that the tension element is designed as a belt, so that the tension element can easily be folded or rolled together with the airbag cushion. So, the overall volume of the airbag device is thus further reduced, so that the required installation space for the airbag device in the side region of the seat is also reduced. Consequently, the upholstery and thus the comfort of the seat can be improved.

According to a further preferred improvement of both the second embodiment and the third embodiment, the length of the tension element or of the belt is less than the width of the airbag cushion.

This allows early engagement of the second attachment arrangement when the airbag device is triggered and the airbag cushion is inflated, thus avoiding any rearward twisting of the airbag cushion and ensuring the operability of the airbag cushion and thus the airbag device.

Furthermore, this also stabilizes the airbag cushion in the lateral direction, so that lateral bending away of the inflated airbag cushion is prevented. Thus, the inflated airbag cushion retains its position in the intended application area laterally adjacent to the seat, so that the reliability and operability is further improved.

Advantageously and according to the invention, according to a further improvement, the fastening device has a bracket which can be screwed, clamped or hooked onto the seat frame.

This facilitates and simplifies the mounting of the airbag cushion, and thus the entire airbag device, at the seat frame substantially. The bracket attached to the tension element or belt can be easily mounted to the seat frame to form the additional attachment point above the first attachment arrangement in the provided manner. The airbag device is delivered as a package with the collapsed airbag cushion for assembly, wherein the tension element or belt hangs as an appendage from the package. The airbag device is secured to the seat frame with the first attachment arrangement, and the bracket attached to the strap is secured to the seat frame above the first attachment arrangement. By means of this inventive and advantageous embodiment of the second attachment arrangement as a belt which hangs as an appendage from the package, the airbag device can be packaged smaller compared to the first embodiment, so that it requires less installation space in the side region of the seat back. Consequently, among other things, the upholstery of the seat and thus the seating comfort can be improved.

A further advantageous improvement provides that the airbag cushion has holding means, which are arranged within the airbag cushion, to dispose the sides of the airbag cushion with a predetermined distance from each other when inflating the airbag cushion.

Thus, an airbag cushion with a large volume can be provided, a so-called 3D airbag cushion, in which the side walls of the airbag cushion are connected or sewn together only at the edges to form the airbag cushion. In the center region of the airbag cushion, however, the side walls are not directly connected to each other, here they are held by the holding means, preferably in the form of tethers or tethering straps, with a predetermined distance from each other when inflating the airbag cushion. This avoids that the heads of the occupants sitting on the seats being separated by the airbag cushion hit each other despite the inflated airbag cushion. If the sidewalls of the airbag cushion were directly sewn together in the middle area, there would not be enough volume to prevent the occupants' heads from colliding.

A further advantageous improvement of the invention provides that a gas generator can be arranged inside the airbag cushion, wherein the airbag cushion has second mounting recesses, which are designed to be attached to the first attachment arrangement.

This considerably eases and simplifies the assembly of the airbag cushion in the airbag device; in particular if, according to a further advantageous improvement, the first attachment arrangement has fastening bolts which are arranged directly on the gas generator. In this case the airbag cushion advantageously has an integrated pocket into which the gas generator can be inserted, and from which the airbag cushion is inflated when the gas generator is triggered. This integrated pocket comprises the second mounting recesses, which are inventively and advantageously each formed as a mounting hole whose diameter is so matched to the diameter of the fastening bolt that it can be preferably pushed sealingly on a fastening bolt.

However, according to a further advantageous improvement, the first attachment arrangement can also comprise a fastening sleeve, wherein fastening bolts can then be arranged on the fastening sleeve, and the airbag cushion with a gas generator arranged in its integrated pocket can be arranged inside the fastening sleeve for forming the airbag device. The person skilled in the art will be aware of further possibilities for fastening the airbag cushion to the seat frame by means of fastening bolts or other fastening means, which are hereby included in the disclosure and the scope of the invention.

By this inventive and advantageous design of the airbag cushion, a further additional attachment point for the airbag cushion is provided, which significantly increases the stability and positioning accuracy of the airbag cushion. In particular, it is achieved that the head region of the airbag cushion is reliably positioned in the intended deployment area next to the headrest of the seat, thus ensuring the functionality of the airbag device according to the invention.

BEST DESCRIPTION OF THE DRAWINGS

Further advantages and features of the invention will become apparent from the following description in conjunction with the drawings. In the drawings.

DETAILED DESCRIPTION

Figure 1:
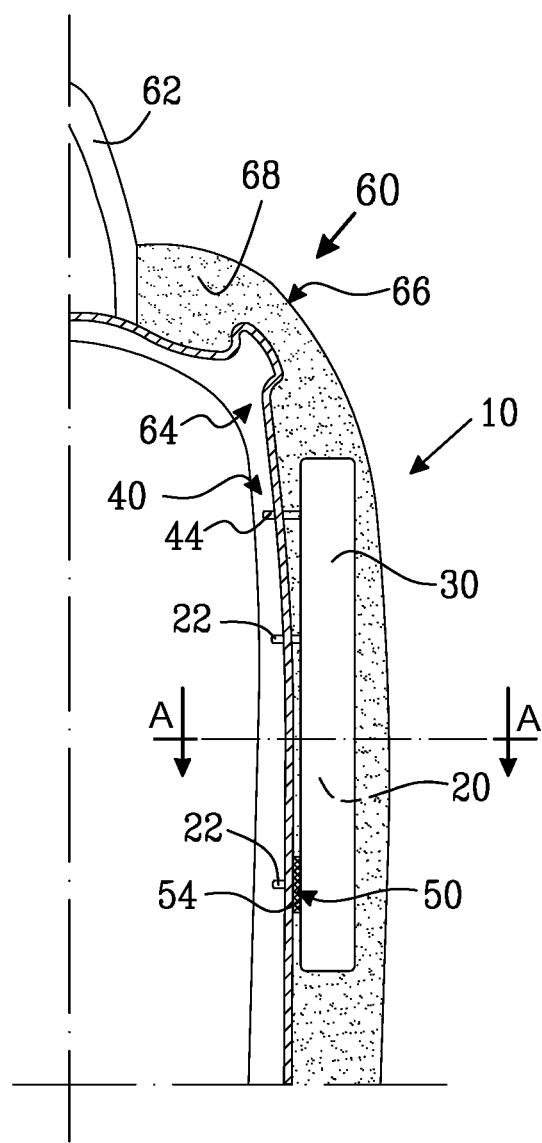
FIG. 1 shows a partial view of the driver's seat (60) of a motor vehicle from the rear in elevation, with an airbag device (10) arranged on the seat frame (64) according to a first embodiment.

FIG. 1 shows a partial view in elevation of the driver's seat (60) of a motor vehicle from the rear, with an airbag device (10) arranged on the seat frame (64) according to a first embodiment. This partial view is a section along the line B-B in FIG. 2. For simplicity only the part of the seat frame (64) on which the airbag device (10) is arranged is shown here. A headrest (62) is disposed at the upper end of the seat frame (64), and an upholstery (68) is attached at the side of the seat frame (64) facing outward towards the adjacent seat and is covered by a cover (66).

The airbag device (10) is arranged and fastened to the seat frame (64) by means of two bolts (22) and comprises, in addition to the two bolts (22), an airbag cushion (30) and a gas generator (20). The gas generator (20) is arranged inside the airbag cushion (30), so that in this illustration only the outside of the airbag cushion (30) surrounding the gas generator (20) can be seen.

Additionally, a bolt (44) can be seen at the upper end of the airbag device (10), which is also arranged and fixed to the seat frame (64). At this bolt (44), which is arranged above the bolt (22) in the upper side region of the seat frame (64), the airbag cushion (30) is fastened with its mounting recess (38). In this way an additional attachment point (40) is provided where the airbag cushion (30) is directly connected to the seat frame (64) or attached to the seat frame (64), as will be explained below. According to the invention and advantageously, this prevents the airbag cushion (30) from twisting backwards when the airbag cushion (30) is inflated. This ensures the accurate and reliable positioning of the head region of the airbag cushion (30) in the intended deployment area adjacent to the headrest (62) of the seat (60). Furthermore, the direct attachment of the airbag cushion (30) to the seat frame (64) leads to an early engagement of the second attachment arrangement (38), thus avoiding any rearward twisting of the airbag cushion (30). Thus, the lower end of the airbag cushion (30) remains in the vicinity of the gas generator (20) even when inflating the airbag cushion (30).

A belt (50) being mounted at the lower fastening bolt (22) is good to see in FIG. 1; its second end (54) is fixed there. By the belt (50) being fastened at this place, a downward force is generated which pulls the airbag cushion (30) downwards and thus also prevents a backward rotation of the airbag cushion (30) when the airbag cushion (30) is inflated. This ensures the accurate and reliable positioning of the head region of the airbag cushion (30) in the intended deployment area adjacent to the headrest (62) of the seat.

Furthermore, it can clearly be seen that the airbag device (10) is arranged inside the upholstery (68) and is surrounded by it so that the airbag device (10) does not protrude from the upholstery (68) and thus the seat comfort is not affected by the airbag device (10).

The airbag device (10) can be arranged in a recess (67) of the upholstery (68), as described below with reference to FIG. 2, but it can also have a separate padding or cover (not shown here) and being integrated in the upholstery with it. There are many different ways to arrange the airbag device (10) in the upholstery (68), which are known in the art, so this needs not be discussed here further.

Figure 2:
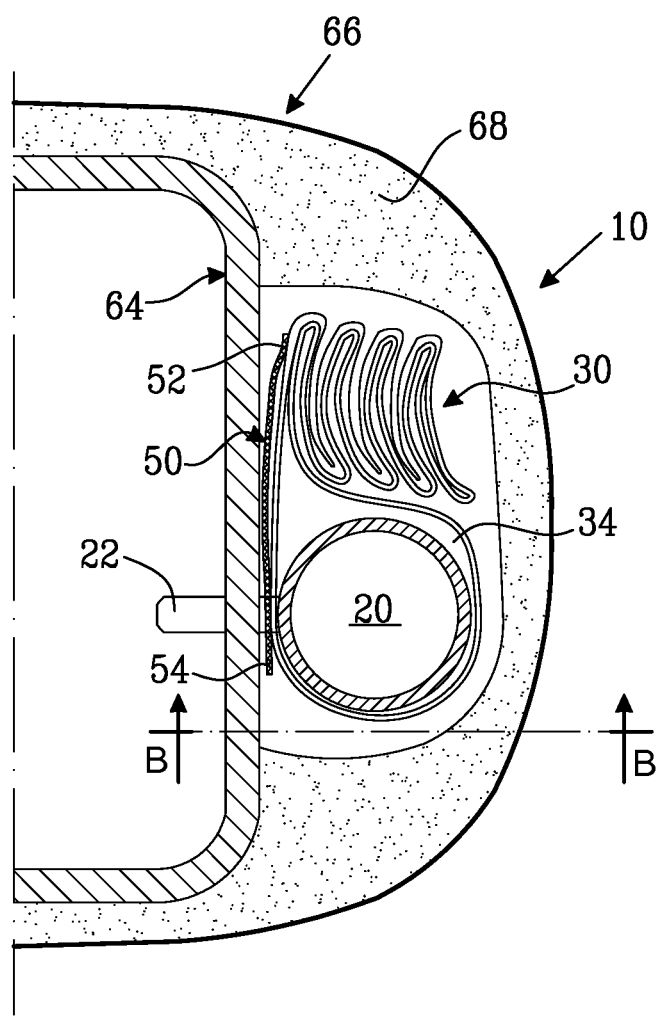
FIG. 2 shows a section through the seat frame (64) of FIG. 1 along the line A-A.

FIG. 2 shows a section through the seat frame (64) of FIG. 1 along the line A-A. On its outer side, i.e. on the side facing the adjacent seat, the seat frame (64) has an upholstery (68) having a recess (67) in which the airbag device (10) is arranged, and being provided with a cover (66). The airbag device (10) has a gas generator (20), an airbag cushion (30) and a first attachment arrangement (22) in the form of fastening bolts (22).

The fastening bolts (22) are arranged on the gas generator (20), and the gas generator (20) is arranged within a chamber (34) of the airbag cushion (30). The gas generator (20), and thus the entire airbag device (10) is arranged on the seat frame (64) and fixed to it by means of the fastening bolts (22). To be considered particularly advantageous here is that the airbag device (10) has only few components that can be easily connected to each other, and that the airbag device (10) can be quickly and easily attached to the seat frame (64) and firmly connected to it. This simplifies and facilitates the assembly and installation of the airbag device (10), and additionally reduces costs.

Good to see here is a belt (50) whose second end (54) is attached on the fastening bolt (22) and whose first end (52) is attached on the lower edge of the airbag cushion (30).

It can also clearly be seen here that the folding of the airbag cushion (30) is arranged in front of the gas generator (20) facing forwards in the direction of travel (upwards in FIG. 2). Thus, the airbag cushion (30) can easily unfold to the front and upwards and thus fulfill the function of a FCA unhindered after triggering of the gas generator (20).

Figure 3:
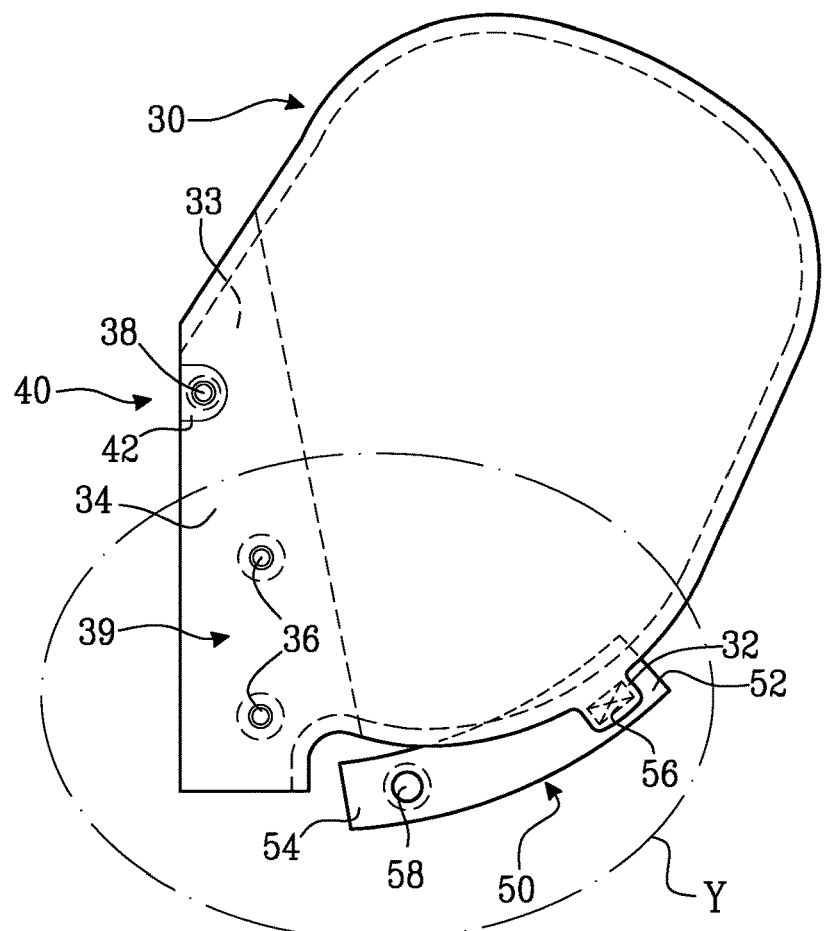
FIG. 3 shows a view of an airbag cushion (30) according to a first embodiment with a second attachment arrangement (38)

FIG. 3 shows a view of an airbag cushion (30) according to a first embodiment with a second attachment arrangement (38) in the side region (33). The airbag cushion (30) has an integrated chamber (34) in which a gas generator (not shown) can be arranged, and comprises second mounting recesses (36) in form of two mounting holes (36). At the lower edge (32) of the airbag cushion (30), a belt (50) is attached to an attachment point (56).

It can be clearly seen here that the second attachment arrangement (38), which is in form of a mounting recess (38) or an attachment hole (38) respectively, is arranged above the mounting holes (36). It is also clear here that the mounting holes (36) are arranged in the connecting region (39) of the first attachment arrangement (22) with the airbag cushion (30).

The connecting region (39) is the portion of the airbag device (10) in which the gas generator (20) and the airbag cushion (30) are connected to each other and which is arranged and fixed to the seat frame (64). For this purpose, a gas generator (20) is inserted into the chamber (34) and arranged therein such that fastening bolts (22) arranged on the gas generator (20) are guide to the outside of the chamber (34) through the mounting holes (36) in order to be arranged and fastened to the seat frame (64) for fastening the airbag device (10). The mounting holes (36) are arranged on a side of the chamber (34) facing the seat frame (64). The other side of the chamber (34) facing away from the seat frame (64), i.e. the side facing the adjacent seat is closed and has no mounting recess or mounting holes.

By this inventive and advantageous arrangement of a second attachment arrangement (38) or mounting recess (38) above the mounting holes (36) of the first attachment arrangement, an additional attachment point (40) for the airbag cushion (30) is provided, which significantly increases the stability and positioning accuracy of the airbag cushion (30). In particular, it is achieved that the head region of the airbag cushion (30) is positioned in the intended deployment area next to the headrest (62) of the seat (60), and thus ensures the operability of the airbag device (10) according to the invention.

This additional attachment point (40) formed by the mounting recess (38) prevents a backward rotation of the airbag cushion (30) during inflation of the airbag cushion (30), so that the accurate and reliable positioning of the head portion of the airbag cushion (30) in the desired deployment area next to the headrest (62) of the seat (60) is ensured. In addition, by the direct attachment of the airbag cushion (30) to the seat frame (64) by means of the second attachment arrangement (38) a timely engagement of the second attachment arrangement (38) is achieved, thus avoiding any backward twisting of the airbag cushion (30).

The belt (50) is a separate component in this case, and is attached with its first end (52) with its attachment point (56) at the lower edge (32) of the airbag cushion (30). At its second end (54) the belt (50) has a first mounting recess (58), which is designed as a mounting hole (58) and matches in its dimensions with the second mounting recesses or mounting holes (36) of the airbag cushion (30).

The dimensions of the mounting holes (36) and (58) are in this case selected so that they coincide with the dimensions of fastening bolts, not shown here, so that the mounting holes (36) and (58) can interact with the not shown fastening bolts for attachment of the airbag cushion (30).

Figure 4:
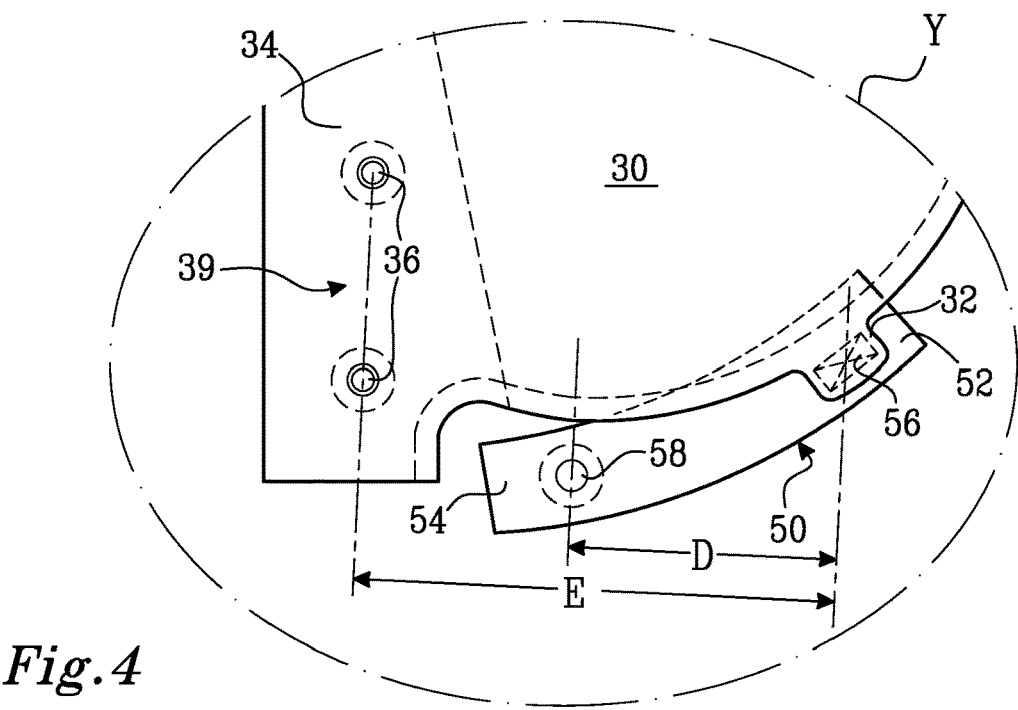
FIG. 4 shows an enlarged view of the detail Y of FIG. 3.

FIG. 4 shows an enlarged view of the detail Y of FIG. 3. The belt (50) is attached with its first end (52) with its attachment point (56) at the lower edge (32) of the airbag cushion (30) by sewing.

The dimensions of the belt (50) and the arrangement of the mounting point (56) and its attachment to the lower edge (32) of the airbag cushion (30) are chosen such that the distance D between the attachment point (56) at the first end (52) of the belt (50) and the first attachment hole (58) at the second end (54) of the belt (50) is less than the distance E between the attachment point (56) at the first end (52) of the belt (50) and the second attachment holes (36) in the chamber (34) of the airbag cushion (30).

To assemble the airbag device (10), first a gas generator (20) (not shown here) is inserted into the chamber (34) of the airbag cushion (30), wherein the fastening bolts (22)

arranged on the gas generator (20) are guided out of the chamber (34) through the second mounting holes (36). Subsequently, the belt (50) is fastened with its first attachment hole (58) to the lower fastening bolt (22) protruding from the lower second attachment hole (36). Finally, the airbag cushion (30) is folded in the manner described and shown above, before the such assembled airbag device (10) is arranged and fixed on a seat frame (64) (not shown here) in the manner also described and illustrated above.

By this inventive and advantageous embodiment, an additional attachment point for the airbag cushion (30) is provided, which significantly increases the stability and positioning accuracy of the airbag cushion (30). In particular, it is thereby achieved that the head region of the airbag cushion (30) is reliably positioned in the intended deployment area next to the headrest (62) of the seat (60), thus ensuring the operability of the airbag device (10) according to the invention.

It is to be considered particularly advantageous here that by this inventive and advantageous embodiment of the airbag cushion (30) a downward force is generated during inflation of the airbag cushion (30), which pulls the airbag cushion (30) down and so prevents a backward rotation of the airbag cushion (30). This, together with the second attachment arrangement (38), ensures the accurate and reliable positioning of the head region of the airbag cushion (30) in the intended deployment area adjacent the headrest (62) of the seat.

Another advantage of this inventive and advantageous embodiment of the airbag cushion (30) is the herewith achieved early intervention or generation of the downward force. Thus, any approach of a backward rotation of the airbag cushion (30) is prevented. In addition, the belt (50) is advantageously and according to the invention made short, so that the lower end of the airbag (30) remains in the vicinity of the gas generator (20) also during the inflation of the airbag (30).

The operation of the airbag device (10) will now be schematically illustrated with reference to FIGS. 5 and 6.

Figure 5:
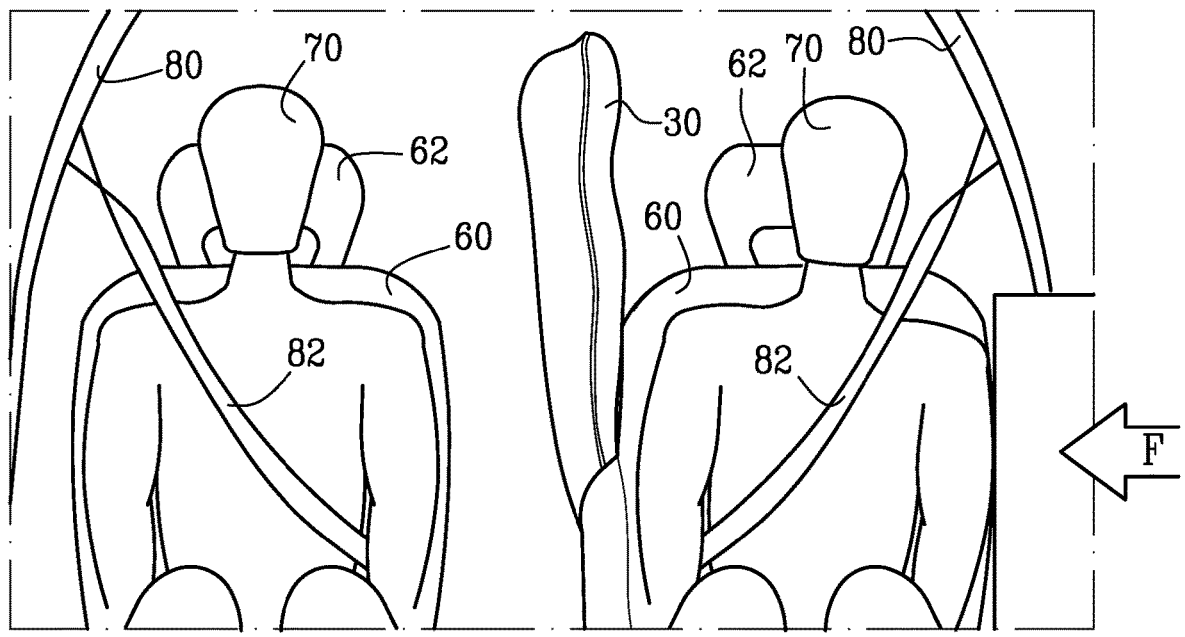
FIG. 5 shows a schematic representation of the mode of operation of the airbag device (10)

FIG. 5 shows in a schematic front view the body (80) of a motor vehicle. In the body (80) two seats (60) are arranged side by side, which represent the driver's seat and the passenger seat. On each seat (60) a crash test dummy (70) is seated which is held on the seat (60) by means of safety belts (82) fastened to the car body (80) such that the heads of the crash test dummies (70) are abutting to the headrests (62) of the seats (60).

In this test arrangement, a side impact is now simulated by applying a lateral force F to the body (80).

The moment immediately after application of the lateral force F is shown in FIG. 5. The side impact has triggered the airbag device (10) (not shown here), so that the gas generator (20), which is also not shown here, has been activated and has fully inflated the FCA or the airbag cushion (30). The passenger (70) or crash test dummy (left in FIG. 5) is still unaffected by the side impact and sits unaltered in its seat (60) and is held by the seat belt (82) on the seat (60) such that the head rests against the headrest (62).

The driver or car crash test dummy (70) (on the right in FIG. 5), on the other hand, has already begun a side-impact generated movement to the right in the opposite direction of the side impact, but is held in place on the seat (60) by the seat belt (82).

The airbag cushion (30) is fully inflated between the two occupants or crash test dummies (70) and extends in the direction of the car body roof over the head height of the crash test dummies (70). As can clearly be seen here, the airbag cushion (30) is located with its head area in the intended deployment area between the two seats, wherein it extends beyond the head height in the direction of the vehicle interior roof. This ensures the secure function of the FCA during a side impact, as will become apparent below with reference to FIG. 6.

Figure 6:
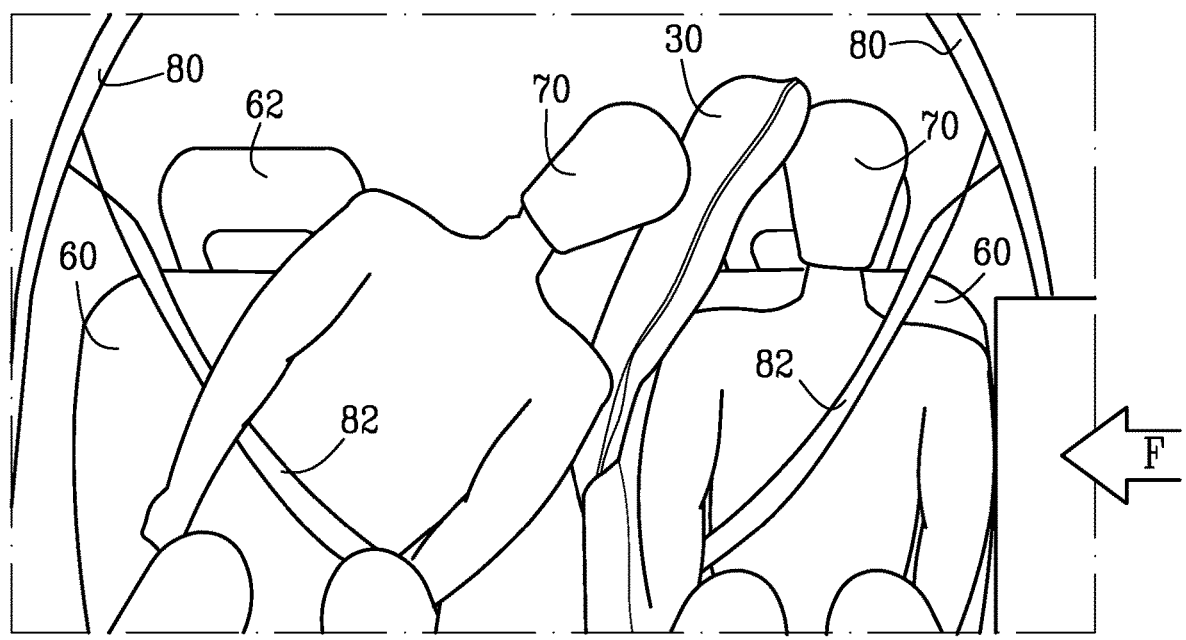
FIG. 6 shows a schematic representation of the mode of operation of the airbag device (10)

In FIG. 6, a moment in the further course of the side impact is shown, in which the passenger or left crash test dummy (70) has also carried out a movement to the right in the opposite direction of the applied force F of the side impact, triggered by the side impact, and has been stopped by the airbag cushion (30). The seat belt (82) cannot stop or decelerate this lateral movement of the crash test dummy (70) because it is designed only for stopping or decelerating a forward movement. The design and positioning of the airbag cushion (30), however, stops or slows down the movement of the crash test dummy (70), wherein both the head and torso of the passenger (the left crash test dummy (70)) as well as the head and torso of the driver (the right crash test dummy (70)) is protected in the side impact.

Figure 7:
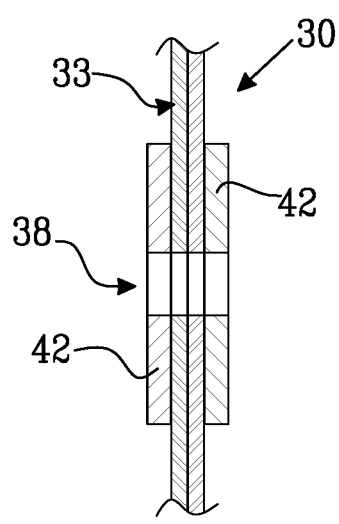
FIG. 7 shows a section through the second attachment arrangement (38) of FIG. 3.

In FIG. 7 a section through the second attachment arrangement (38) or mounting recess (38) of FIG. 3 is shown schematically. In the side region (33) of the airbag cushion (30), the two sides of the airbag cushion (30) lie directly against each other, wherein—as can be clearly seen—the airbag cushion (30) is a so-called 2D airbag cushion, i.e. an airbag cushion with two sides or two layers.

The mounting recess (38) extends through the two sides or layers of the airbag cushion (30) and thus forms a through hole. A reinforcing material (42) is attached around the through hole (38) in the peripheral area on both sides to reinforce the through hole (38). The reinforcing material (42) may be sewn or glued to the airbag cushion (30).

It should be noted at this point that the mounting recess (38) of the second attachment arrangement (38) forms a through hole as mentioned, and thus extends through both sides or layers of the airbag cushion (30). In contrast, the second mounting recesses (36) of the first attachment arrangement (22) extends only through one side of the airbag cushion (30) in order to guide the fastening bolts (22) of the first attachment arrangement (22) attached to the inflator (20) out of the chamber (34) of the airbag cushion (30) to the connecting region (39).

Figure 8:
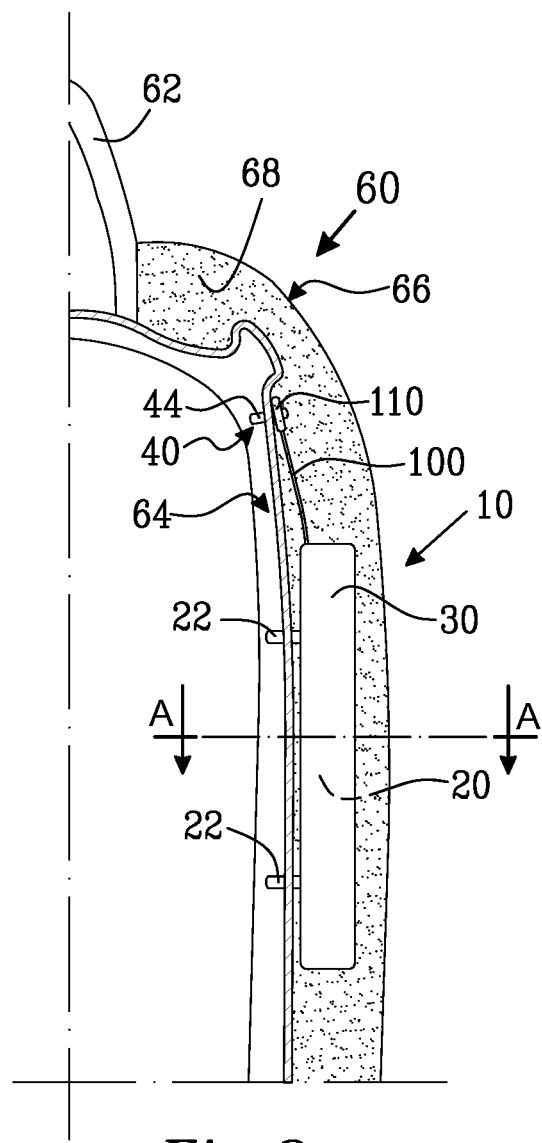
FIG. 8 shows a partial view of the driver's seat (60) of a motor vehicle from the rear in elevation, with an airbag device (10) arranged on the seat frame (64) according to a second embodiment.

FIG. 8 shows a partial view of the driver's seat (60) of a motor vehicle, with an airbag device (10) arranged on the seat frame (64) according to a second embodiment from the rear in elevation. This partial view is a section along line B-B in FIG. 10. For simplicity only the part of the seat frame (64) on which the airbag device (10) is arranged is shown here. A headrest (62) is disposed at the upper end of the seat frame (64), and an upholstery (68) is attached to the side of the seat frame (64) facing outward of the adjacent seat and is covered by a cover (66).

The airbag device (10) is arranged and fastened to the seat frame (64) by means of two bolts (22) and comprises, in addition to the two bolts (22), an airbag cushion (30) and a gas generator (20). The gas generator (20) is arranged inside the airbag cushion (30), so that in this illustration only the outside of the airbag cushion (30) surrounding the gas generator (20) can be seen.

Further, a bolt (44) is seen at the upper end of the airbag device (10), which is also arranged and fixed to the seat frame (64). At this bolt (44), which is arranged above the bolts (22) in the upper side region of the seat frame (64), the airbag cushion (30) is fastened to a second attachment arrangement (100) in the form of a belt (100). A fastener or bracket (110) is arranged on the strap (100) to cooperate with the bolt (44) to secure the strap (100).

As will be explained below, an additional attachment point (40) is provided in this way at which the airbag cushion (30) is directly connected to the seat frame (64) or attached to the seat frame (64). According to the invention and advantageously, this prevents the airbag cushion (30) from twisting backwards when the airbag cushion (30) is inflated. This ensures the accurate and reliable positioning of the head region of the airbag cushion (30) in the intended deployment area adjacent to the headrest (62) of the seat (60). Furthermore, by the direct attachment of the airbag cushion (30) to the seat frame (64) a timely engagement of the second attachment arrangement (100) is achieved so that any attempt of a rearward rotation of the airbag cushion (30) is prevented. Thus, the lower end of the airbag cushion (30) remains in the vicinity of the gas generator (20) even when the airbag cushion (30) is inflated. Furthermore, it can clearly be seen here that the airbag device (10) is arranged inside the upholstery (68) and is surrounded by it so that the airbag device (10) does not protrude from the upholstery (68) and thus the seat comfort by the airbag device (10) is not affected.

The airbag device (10) may be disposed in a recess (67) of the upholstery (68) as described below with reference to FIG. 9, but may also have a separate covering or cover (not shown) and be integrated with it in the upholstery (68). There are many different ways to arrange the airbag device (10) in the upholstery (68), which are known in the art, so this needs not to be discussed further here.

Figure 9:
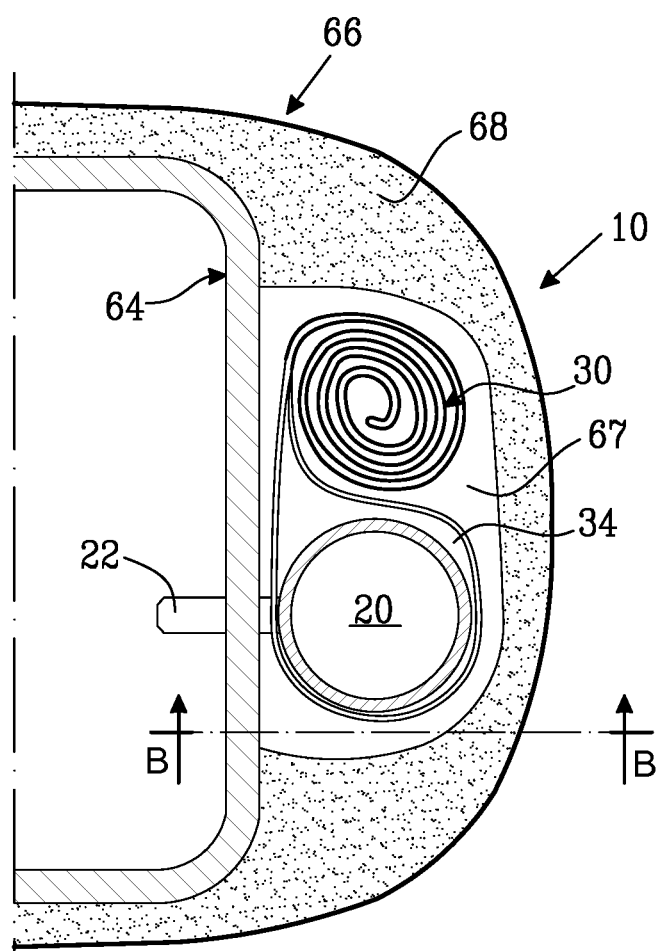
FIG. 9 shows a section through the seat frame (64) of FIG. 8 along the line A-A.

FIG. 9 shows a section through the seat frame (64) of FIG. 8 along line A-A. The seat frame (64) comprises an upholstery (68) on its outer side, i.e. on the side facing the adjacent seat, in which the airbag device (10) is arranged in a recess (67) and which is provided with a cover (66). The airbag device (10) has a gas generator (20), an airbag cushion (30) and a first attachment arrangement (22) in the form of fastening bolts (22).

The fastening bolts (22) are arranged on the gas generator (20), and the gas generator (20) is arranged within a chamber (34) of the airbag cushion (30). By means of the fastening bolts (22), the gas generator (20), and thus the entire airbag device (10), is arranged on the seat frame (64) and fastened to it. To be considered particularly advantageous here is that the airbag device (10) has only a few components that can easily be connected to each other, and that the airbag device (10) can be quickly and easily attached to the seat frame (64) and can be firmly connected with it. This simplifies and facilitates the assembly and installation of the airbag device (10), and also reduces costs.

It is good to see here that the rolled up airbag cushion (30) is arranged in the recess (67) in front of the gas generator (20) facing in the direction of travel (in FIG. 9 upward). Thus, the airbag cushion (30) can deploy to the front and upward after the triggering of the airbag device (10), and can thus unfold accurately and reliably in the intended deployment area next to the headrest (62) of the seat (60) and can so perform the function of FCA unhinderedly.

Figure 10:
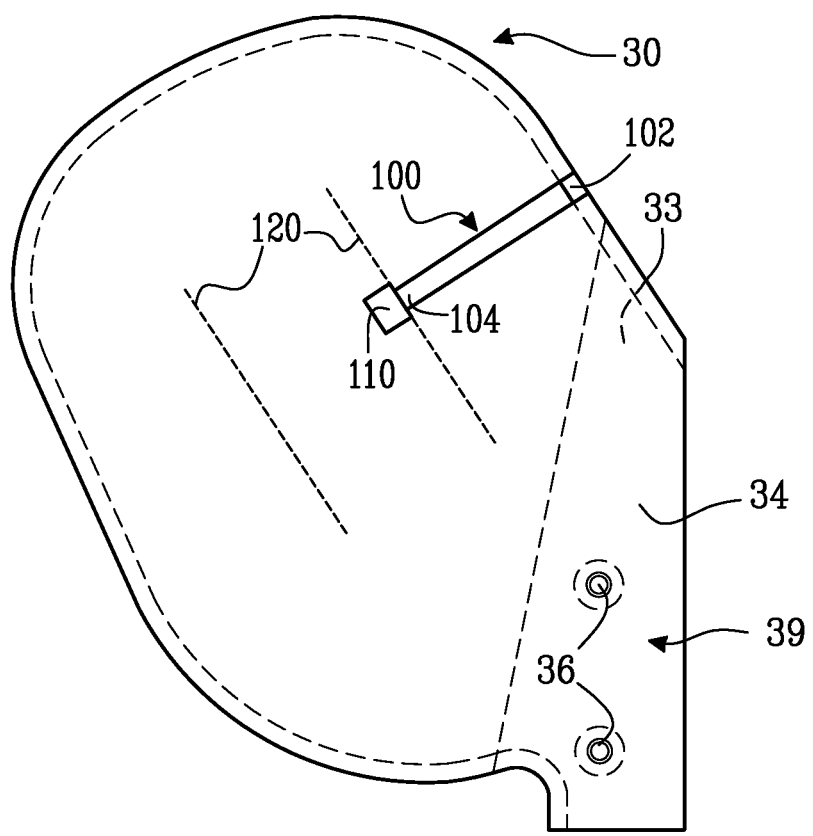
FIG. 10 shows a view of an airbag cushion (30) according to a second embodiment with a second attachment arrangement (100) according to a second embodiment.

FIG. 10 shows a view of an airbag cushion (30) according to a second embodiment, with a second attachment arrangement (100) in the side region (33) according to a second embodiment. The airbag cushion (30) has an integrated chamber (34) in which a gas generator (not shown) can be arranged, and which comprises the second mounting recesses (36) being formed as two mounting holes (36).

One can clearly see here that the second attachment arrangement (100) being formed as tension element (100) or belt (100) is arranged above the mounting holes (36). For this purpose, the first end (102) of the belt (100) is arranged and fixed in the edge region or side region (33) of the airbag cushion (100). At its second end (104) the belt (100) comprises a fastening device (110) which is designed as a bracket (110) and which can be secured to a designated location on a seat frame. This second end (104) of the belt (100) is free and can thus easily and simply be attached to the intended location of the seat frame (64) during assembly of the airbag device (10) in order to form the additional attachment point (40) of the airbag device (10).

It is also clear that the mounting holes (36) are arranged in the connection region (39) of the airbag cushion (30) with the first attachment arrangement (not shown here).

The connecting region (39) is the portion of the airbag device (10) in which the gas generator (20) and the airbag cushion (30) are connected to each other and which is arranged and fixed to the seat frame (64). For this purpose, a gas generator (20) is inserted into the chamber (34) and arranged therein such that fastening bolts (22) arranged on the gas generator (20) are guided through the mounting holes (36) out of the chamber (34) in order to be arranged and fastened to the seat frame (64) to fasten the airbag device (10). The mounting holes (36) are arranged on a side of the chamber (34) facing the seat frame (64). The other side of the chamber (34) facing away from the seat frame (64), i.e. the side facing the adjacent seat, is closed and has no mounting recess or mounting holes.

The dimensions of the mounting holes (36) are in this case chosen such that they coincide with the dimensions of fastening bolts of the first attachment arrangement, not shown here, such that the mounting holes (36) for fastening the airbag cushion (30) can cooperate with the fastening bolt, not shown.

By the inventive and advantageous arrangement of a second attachment arrangement (100) above the mounting holes (36) of the first attachment arrangement an additional attachment point (40) for the airbag cushion (30) is provided which clearly enhances the stability and the positioning accuracy of the airbag cushion (30). In particular, it is achieved that the head region of the airbag cushion (30) is positioned in the intended deployment area next to the headrest (62) of the seat (60), and thus ensures the operability of the inventive airbag device (10).

This additional attachment point (40) formed by the fastening device (110) or the bracket (110) prevents a reverse rotation of the airbag cushion (30) during the inflation of the airbag cushion (30), so that the precise and reliable positioning of the head region of the airbag cushion (30) in the intended deployment area next to the headrest (62) of the seat (60) is ensured. In addition, by the direct attachment of the airbag cushion (30) to the seat frame (64) by means of the second attachment arrangement (100) a timely engagement of the second attachment arrangement (100) is achieved so that any attempt of a rearward rotation of the airbag cushion (30) is avoided.

Furthermore, in FIG. 10 holding means (120), which are formed as tethers (120) or retaining straps (120), and which are arranged within the airbag cushion (30) can be seen. Here, the attachment points of one end of the tethers (120) with a side wall of the airbag cushion (30) are shown. The tethers (120) are attached at their other end to the opposite side wall of the airbag cushion (30), so that the opposite sides of the airbag cushion (30) position with a predetermined distance from each other when the airbag cushion (30) is inflated.

Thus, a large-volume airbag cushion 30 can be provided, a so-called 3D airbag cushion, in which only the side walls of the airbag cushion 30 are connected or sewn together at the edges to form the airbag cushion 30. In the middle region of the airbag cushion (30), however, the side walls are not directly connected, here they are held at a predetermined distance from each other by the holding means (120), preferably in the form of tethers (120) or holding straps (120), when inflating the airbag cushion (30). This avoids that the heads of the occupants on the seats (60) separated by the inflated airbag cushion (30) hit each other despite the inflated airbag cushion (30). If the sidewalls of the airbag cushion (30) were directly sewn together in the central area, there would not be enough volume to prevent the occupants' heads from colliding.

Figure 11:
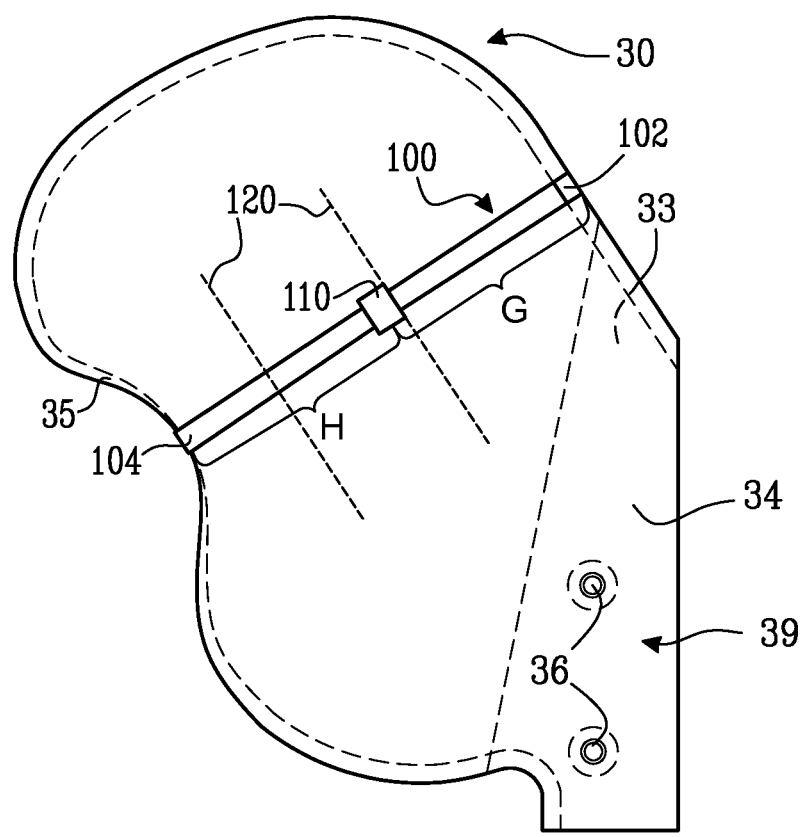
FIG. 11 shows a view of an airbag cushion (30) according to a second embodiment with a second attachment arrangement (100) according to a third embodiment.

FIG. 11 shows a view of an airbag cushion (30) according to a second embodiment, with a second attachment arrangement (100) according to a third embodiment in the side region (33). The airbag cushion (30) has an integrated chamber (34) in which a gas generator (not shown) can be arranged, and the two second mounting recesses (36) formed as mounting holes (36).

Good to see here is that the second attachment arrangement (100) formed as tension element (100) or belt (100) is arranged above the mounting holes (36). For this purpose, the first end (102) of the belt (100) is arranged and fixed in the edge region or side region (33) of the airbag cushion (100).

The second end (104) of the belt (100) is arranged and fixed at the opposite edge region or side region (35) of the airbag cushion (30). Good to see here is that the length of the tension element (100) is less than the width of the airbag cushion (30). Thus, upon inflation of the air bag cushion (30), a counterforce is created which prevents rotation of the inflated air bag cushion (30) and positions the head portion of the inflated air bag cushion (30) in the intended deployment area adjacent the head restraint (62) of the seat (60). This ensures the functionality of the airbag device (10) according to the invention.

In its center region, the belt (100) has a fastening device (110) in the form of a bracket (110) which can be fastened on a seat frame (64) in a designated position in order to form the additional attachment point (40) of the airbag device (10).

Good to see here is that the bracket (110) is arranged on the tension element or belt (100) such that the distance (G) between the bracket (110) and the first end (102) is less than the distance (H) between the bracket (110) and the second end (104).

By this inventive and advantageous arrangement of the bracket (110) an additional attachment point for the airbag cushion (30) can be provided that increases significantly the stability and positioning accuracy of the airbag cushion (30) when mounting the airbag cushion (30) or the airbag device (10). In particular, it is achieved that the head region of the airbag cushion (30) is positioned in the intended deployment area next to the headrest (62) of the seat (60), and thus ensures the operability of the airbag device (10).

In addition, by the direct attachment of the airbag cushion (30) on the seat frame (64) by means of the bracket (110) an early engagement of the second attachment arrangement (100) is achieved, so that any approach of a reverse rotation of the airbag cushion (30) is avoided.

Furthermore, this also stabilizes the airbag cushion (30) in the lateral direction, so that lateral folding away of the inflated airbag cushion (30) is prevented. Thus, the inflated airbag cushion (30) keeps its position in the intended area of use laterally adjacent to the seat (60), so that the reliability and operability is further improved.

LIST OF REFERENCE NUMBERS 10 airbag device
20 gas generator
22 first attachment arrangement/fastening bolts
30 airbag cushion
32 lower edge of airbag cushion
33 side region of airbag cushion
34 chamber of airbag cushion
35 side region of airbag cushion
36 second mounting recess
38 second attachment arrangement (attachment arrangement/mounting recess)
39 connecting region
40 additional attachment point
42 reinforcing material
44 bolt/screw
50 tension element/belt
52 first end of tension element
54 second end of tension element
56 attachment point
60 seat
62 headrest
64 seat frame
66 cover
67 cavity
68 upholstery
70 dummy
80 car body
82 safety belt
100 second attachment arrangement/tension element
102 first end of tension element
104 second end of tension element
110 fastening device
120 holding means/tether
A View A-A
B view B-B
D distance D
E distance E
F lateral force
G distance G
H distance H
Y detail airbag cushion

The invention claimed is:

1. An airbag cushion for an automotive airbag device that is mountable and securable to a seat frame and that is configured to protect an occupant's head and thorax in response to a side impact or rollover;

wherein the airbag device further comprises a gas generator and a first attachment arrangement, wherein the first attachment arrangement, the gas generator and the airbag cushion are interconnected to attach the airbag device to the seat frame, wherein the airbag cushion comprises a second attachment arrangement arranged at a side region of the airbag cushion above a connection region with the first attachment arrangement and which is adapted for securing the airbag cushion to the seat frame with an additional attachment point above the first attachment arrangement, and wherein the second attachment arrangement comprises a tension element, the tension element being arranged with a first end at the side region of the airbag cushion above the connecting region of the first attachment arrangement, and with a second end at the opposite side region of the airbag cushion, and wherein additionally a fastening device is provided at the tension element between the first end and the second end in order to fasten the airbag cushion with an additional attachment point on the seat frame above the first attachment arrangement, by the fastening device, and at a fixed, designated location on the seat frame.

2. The airbag cushion according to claim 1, wherein the second attachment arrangement comprises a mounting recess for attaching the airbag cushion to the seat frame with a side region of the airbag cushion.

3. The airbag cushion according to claim 2, wherein the mounting recess is provided with a reinforcing material surrounding the mounting recess.

4. The airbag cushion according to claim 3, wherein the reinforcing material surrounding the mounting recess is sewn or glued onto the airbag cushion.

5. The airbag cushion according to claim 1, the second attachment arrangement comprises a tension element, wherein the tension element is arranged with a first end at the side region of the airbag cushion above the connecting region with the first attachment arrangement, and wherein additionally a fastening device is provided at the tension element to attach the airbag cushion with an additional attachment point on the seat frame above the first attachment arrangement by the fastening device.

6. The airbag cushion according to claim 5, wherein a length of the tension element is less than a width of the airbag cushion.

7. The airbag cushion according to claim 5, wherein the fastening device comprises a bracket which can be screwed, clamped, or hooked to the seat frame.

8. The airbag cushion according to claim 1, the fastening device is arranged on the tension element such that a first distance between the fastening device and the first end is less than a second distance between the fastening device and the second end.

9. An airbag device for a motor vehicle, the airbag device attachable to a seat frame of the motor vehicle, the airbag device comprising:
    a gas generator;
    an airbag cushion;
    a first attachment arrangement, the first attachment arrangement, the gas generator and the airbag cushion interconnected to secure the airbag device to the seat frame; and
    a second attachment arrangement arranged in a side region of the airbag cushion above a connection region with the first attachment arrangement and formed for securing the airbag cushion to the seat frame with an additional attachment point above the first attachment arrangement,
    wherein the second attachment arrangement comprises a tension element, the tension element arranged with a first end at the side region of the airbag cushion above the connecting region of the first attachment arrangement, and with a second end at the opposite side region of the airbag cushion, and wherein additionally a fastening device is provided at the tension element between the first end and the second end in order to fasten the airbag cushion with an additional attachment point on the seat frame above the first attachment arrangement by the fastening device.

10. The airbag device of claim 1 in combination with the seat frame, the second end secured to the seat frame at the fixed, designated location.

* * * * *